United States Patent [19]

Nakao et al.

[11] Patent Number: 4,773,124
[45] Date of Patent: Sep. 27, 1988

[54] CASTER STOPPER MECHANISM FOR A BABY CARRIAGE

[75] Inventors: Shinroku Nakao, Kanagawa; Yoshiyuki Suzuki; Hitoshi Kato, both of Tokyo, all of Japan

[73] Assignee: Combi Co., Ltd., Tokyo, Japan

[21] Appl. No.: 91,135

[22] Filed: Aug. 31, 1987

[30] Foreign Application Priority Data

Aug. 29, 1986 [JP] Japan ............................ 61-203065

[51] Int. Cl.$^4$ ............................................. B60B 33/00
[52] U.S. Cl. ............................................. 16/35 R; 16/44
[58] Field of Search ................... 16/35 R, 29, 44, 45, 16/35 D, 31 R, 31 A, 20; 280/47.38, 47.39, 47.41

[56] References Cited

FOREIGN PATENT DOCUMENTS 2292596 6/1976 France ........................... 16/35 R Primary Examiner—Fred A. Silverberg
Attorney, Agent, or Firm—Sughrue, Mion, Zinn, Macpeak & Seas

[57] ABSTRACT

A wheel caster for a baby carriage in which a caster body is rotatable about a holder attached to a leg of the carriage. A stopper pivots in the caster body and is engagable with a vertical groove in the holder to prevent further rotation. The stopper has bosses which fit into vertical grooves in opposed arms of the caster body. Interiorly facing partial collars are formed in the arms beneath the grooves. Tabs on the stopper are engaged beneath the collars so that the stopper can not be removed but can nonetheless be easily assembled.

7 Claims, 4 Drawing Sheets

CASTER STOPPER MECHANISM FOR A BABY CARRIAGE

BACKGROUND OF THE INVENTION

1. Field of the Invention

The present invention relates to an improvement in a stroller or baby carriage for transporting or carrying a baby. It particularly relates to a mechanism for stopping a caster having a wheel elastically and rotatably mounted.

2. Background of the Invention

Taking a baby or an infant out in the open air for a walk or for sun-bathing is necessary for the baby or infant to grow up healthy. It is, however, very uncomfortable for a guardian of the baby or infant to hold or carry the baby or infant in the arms or on the back for a long time. On the other hand, it is never desirable for the health of a growing baby or infant to be kept in a rigid posture for a long time.

To eliminate those inconveniences, baby carriages have been developed and a number of excellent improvements have so far been developed in those baby carriages.

Some baby carriages, as represented by bassinets, were intended as their initial main object to carry babies laid on their sides in the baby carriages. These have subsequently been so developed that babies can be carried as if they are sitting on chairs.

Through those improvements, the baby carriages have been so designed as to be portable to thereby make it possible to carry the baby carriages into public traffic means such as subway cars. The baby carriages which had been used merely in the immediate neighborhood of households have thus been made available also for an outing over a long distance.

In such baby carriages, wheels are the only constituent member for ground contact. Accordingly, a comfortable ride is greatly influenced by construction of a mechanism for mounting the wheels. For this reason, improvements in structure for mounting wheels in the baby carriages have also evoked great public attention.

Various improvements with respect to a mechanism for supporting wheels have been already developed as follows:

(1) An improvement in that a caster for supporting a wheel has an elastically supporting mechanism;

(2) An improvement in that a caster is mounted rotatably relative to a leg bar;

(3) An improvement in that a caster mounted rotatably relative to a leg bar can be stopped from rotating as occasion demands; and so on.

Amount those known mechanisms, the mechanism for stopping the rotation of a caster, that is, the stopper mechanism, which is a subject of the present invention, has disadvantageous in the following points because a stopper is pivotally mounted so as to be able to be raised and lowered with respect to a caster body.

(1) At least three parts, that is, a caster body, a stopper and a pivot are necessary for constructing a stopper mechanism separately from one another. Additionally a troublesome process of attaching the stopper through the pivot to the caster body is required, resulting in an increase in the number of manufacturing steps as well as in assembling cost.

(2) A hole for inserting the pivot for attaching the stopper is exposed at the outside of the caster body, so that not only is the attractiveness in appearance reduced, but the function for the vertical swinging movement of the stopper may be degraded because foreign matter, such as dust, water and the like, may penetrate into and accumulate within the hole.

SUMMARY OF THE INVENTION

To overcome those problems, it is an object of the present invention to provide a caster stopper mechanism in a baby carriage, in which a stopper can be attached to a caster body without use of a pivot as a rotational axis and can be attached to the caster body so as not to be freely floating from the caster body.

It is another object of the present invention to provide a caster stopper mechanism in a baby carriage, the mechanism being constructed so that no pivot is used to reduce the number of constituent members for the purpose of reduction in cost of parts and so that the assembling process can be simplified to thereby reduce the manufacturing cost.

According to the present invention, a wheel supporting caster has a holder attached to the lower end of a leg bar and a caster body is rotatably attached to the lower surface of the holder. A stopper is attached to one side of the caster body so as to be able to be raised and lowered. The stopper has one side arranged to be fitted in a fitting groove formed in one side surface of the holder and has engagement/stopper projections provided at its opposite sides and fitted into fitting grooves of the caster body. The stopper further has floating prevention tabs provided on the respective upper ends of the engagement/stopper projections and which are arranged to respectively engage with engagement/stopper collars respectively formed at the lower ends of the fitting grooves so that the stopper can be doubly prevented from floating from the caster body.

BRIEF DESCRIPTION OF THE DRAWINGS

The drawings show an embodiment of the present invention, in which.

DETAILED DESCRIPTION OF THE PREFERRED EMBODIMENTS

Referring to the accompanying drawings, an embodiment of the invention will be described hereunder.

Figure 1:
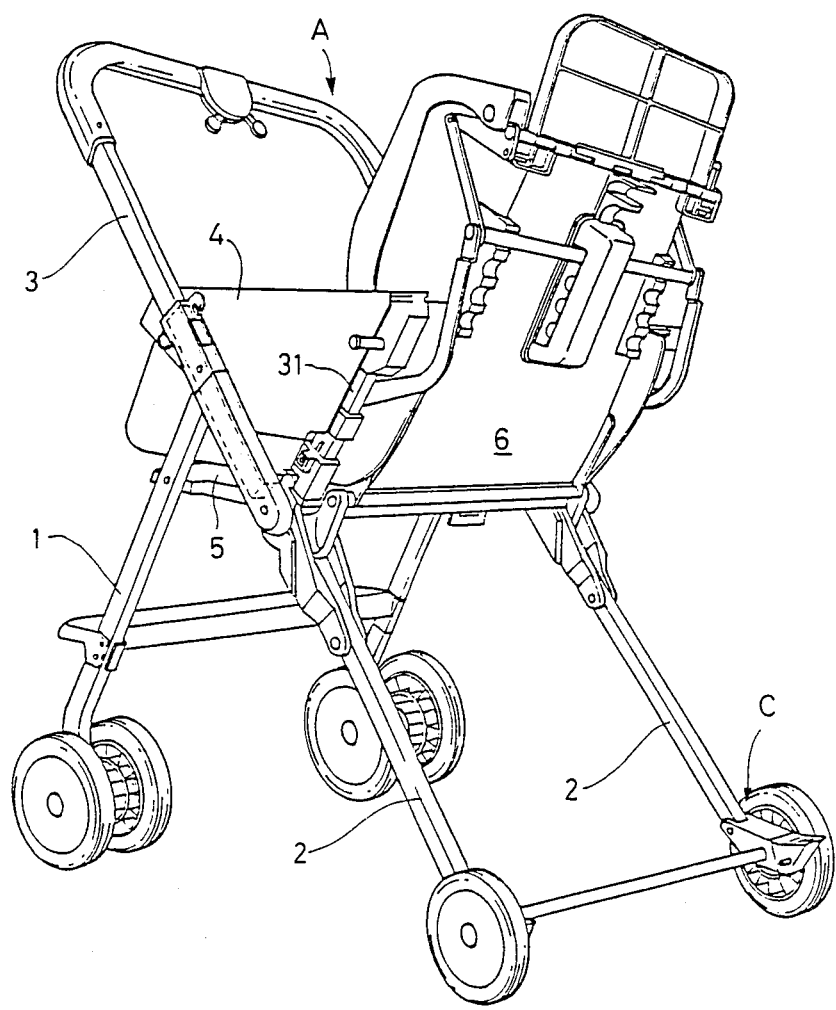
FIG. 1 is a perspective view showing the condition of use in a baby carriage.

In a baby carriage generally designated by A, as shown in FIG. 1, front leg bars 1, rear leg bars 2, a handle bar 3 and armrest bar 4 are foldably coupled and assembled to constitute a body of the baby carriage. Each of the armrest bars 4 are interposed between a pivot portion where the upper ends of a front leg bar 1 and a rear leg bar 2 are rotatably attached at one place and, on the other side, a bearing bar 31 vertically erected from the longitudinally middle portion of the rear leg bar 2.

A seat 5 having a backrest 6 is pivotally attached to the rear end of the seat 5 so that the inclination angle can be adjusted.

Figure 2:
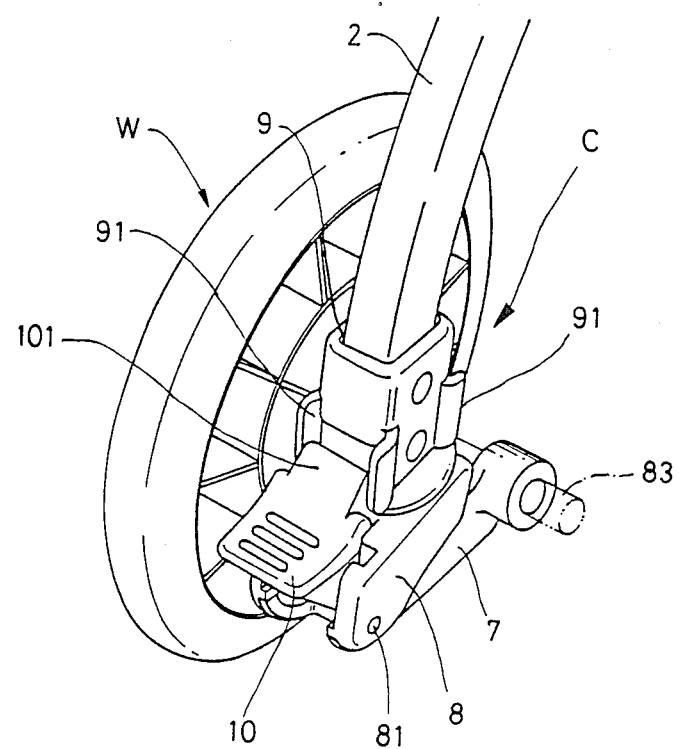
FIG. 2 is a partly cutaway perspective view of important parts seen from the rear side.
Figure 3:
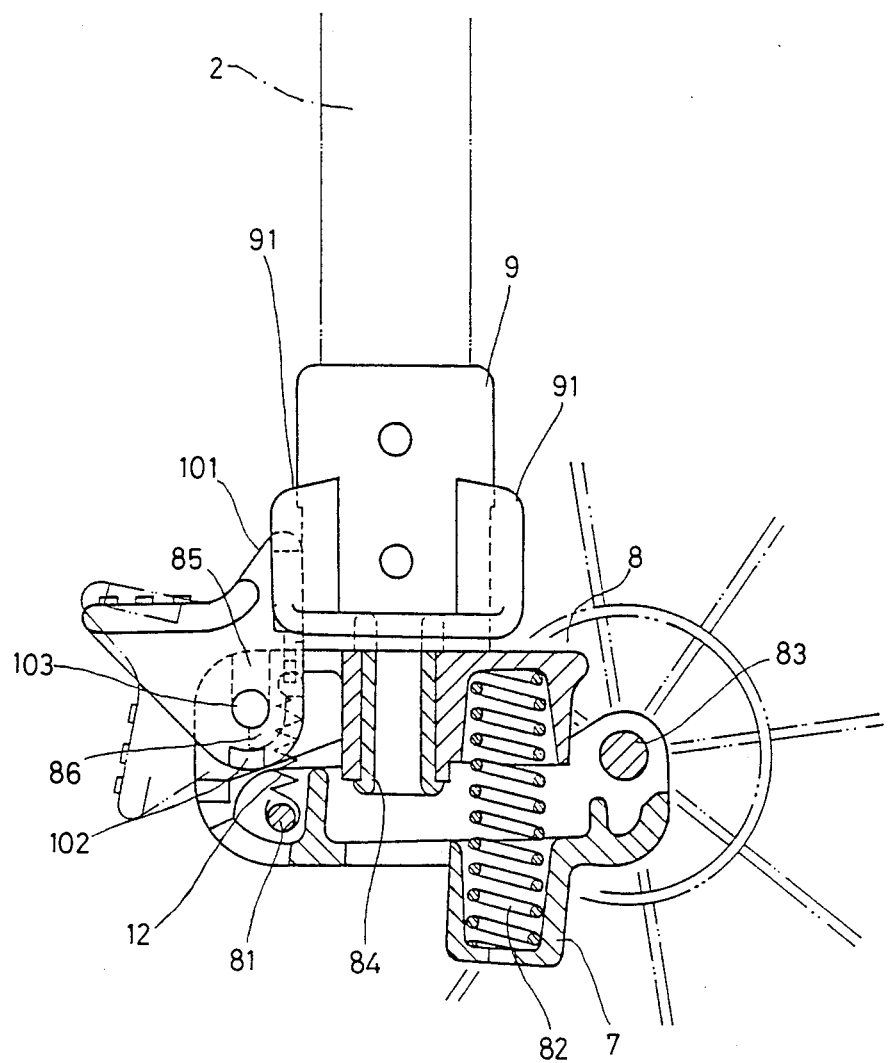
FIG. 3 is a sectional view of important parts.

A caster generally designated by C is constituted, as shown in FIGS. 2 and 3, by a caster shaft bearing 7, a caster body 8, a holder 9 and a stopper 10.

Figure 4:
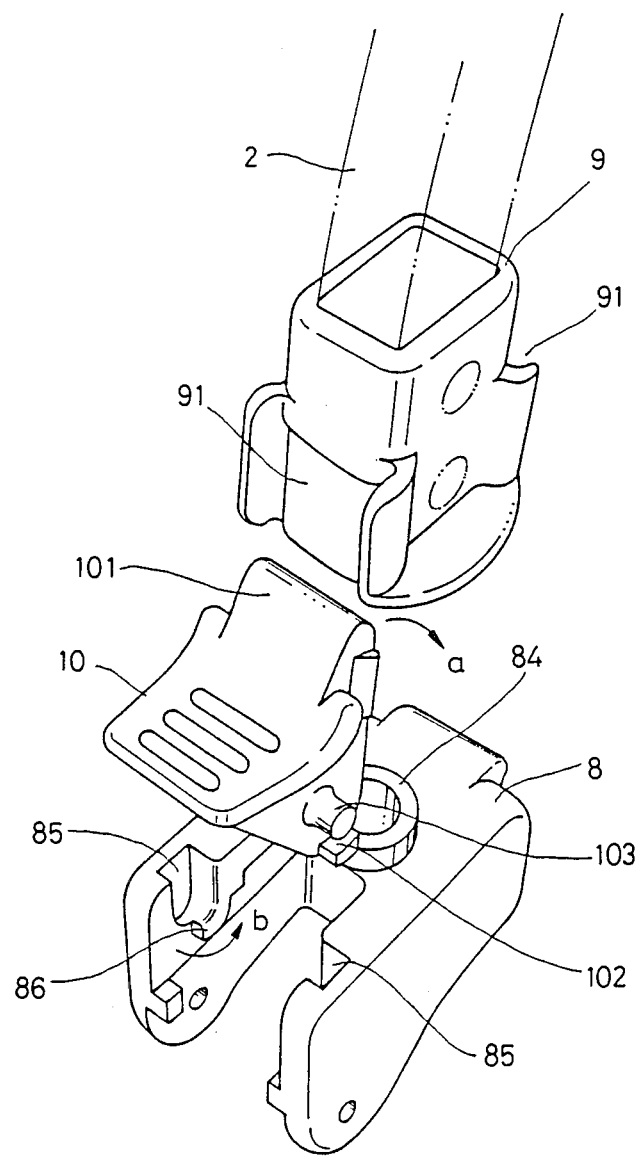
FIG. 4 is an exploded perspective view of important parts.

As shown in FIG. 4, the caster body 8 is substantially U-shaped in top view. As shown in FIG. 2, a free end portion (having U-shaped fork ends or arms) of the caster body 8 is pivotally attached at a horizontal pivot 81 to an upper end portion of the caster shaft bearing 7 so that the other end of the caster body 8 can elastically slightly move up and down on the caster shaft bearing 7. The elastic force is effectuated by a spring 82 interposed between the caster shaft bearing 7 and the caster body 8 at the other end of the caster body 8. A pivot 83 supports a wheel W.

The holder 9 is fixedly attached to the lower end of a rear leg bar 2. As shown in FIG. 4, a connection sleeve 84 projecting from the caster body 8 is rotatably connected to the lower end surface of the holder 9. Fitting grooves 91 are formed at the opposite sides of the holder 9 so as to grasp an engagement/stopper segment 101 of the stopper 10.

The stopper 10 is substantially triangularly shaped or V-shaped in side view. One side of the stopper 10 forms the engagement/stopper segment 101 for engaging with the fitting grooves 91 formed at the sides of the holder 9. Floating prevention tabs 102 each having a gentle arcuate curve are formed at the top portions of the opposite triangular sides of the holder 9 so as to project over a predetermined width. At a portion slightly above the tabs 102, engagement/stopper bosses 103 are provided so as to be fitted into vertically elongated fitting grooves 85 formed in the caster body 8.

Preferably, the height of the floating prevention tabs 102 is made equal to that of the engagement/stopper bosses 103.

The arc of the respective floating prevention tab 102 is made coincident with the arc drawn by the top end portion of the stopper 10 when the stopper 10 rotates around the engagement/stopper boss 103 as a pivot.

Preferably, the width of the tab 102 is made equal or approximately equal to the diameter of the engagement/stopper boss 103.

A pair of fitting grooves 85 engage with the engagement/stopper bosses 103 and are formed to be in the vicinity of the top end portion of the stopper 10. Each groove 85 is so constructed as to make its upper end surface open inward of the free end fork portion of the caster body 8.

At the lower end portions of the fitting grooves 85, J-shaped collars 86 are provided to project therefrom for engaging with the floating prevention tabs 102 extending at the opposite sides from the top end portions of the stopper 10. The J-shaped collars 86 have upper surfaces continuous with the fitting grooves 85, and lower downwardly facing surfaces vertically displaced from the fitting grooves 85. The lower surfaces are opened in the front (as viewed in FIG. 4) but abut against a stopper in the rear.

The thickness of the respective J-shaped collar 86 formed at the lower portion of the fitting groove 85 is made slightly smaller than the distance between the upper side of the floating prevention tab 102 formed at the stopper 10 and the lower end surface of the engagement/stopper boss 103.

A spring 12, shown in FIG. 3, is tensioned between a slot in the stopper 10 and the caster shaft bearing 7 in order to contract the two toward each other. Two states of the stopper 10, for example, the erected state (engaged state) or the fallen state (disengaged state), can be stably maintained by the spring 12 since its maximally tensioned state is in between.

The parts are assembled into the caster according to the present invention in such a manner as follows.

First, one end portion of the caster body 8 is pivotally attached through the pivot 81 to the corresponding caster shaft bearing 7.

Next, the stopper 10 is attached to the caster body 8 which has been pivotally attached at the pivot 81. In this case, while the engagement/stopper segment 101 of the stopper 10 is inclined frontwards (in the direction of the arrow a illustrated in FIG. 4), the engagement/stopper bosses 103 are fitted into the long vertical fitting grooves 85 formed at the caster body 8 and are lowered therein. Upon completion of the lowering of the engagement/stopper projections 103, the inclination of the engagement/stopper segment 101 is returned to the upright position so that the floating prevention tabs 102 formed below to the engagement/stopper segments 101 move in the direction of the arrow b on the lower surfaces of the J-shaped collars 86 so as to be finally located at the lower surfaces of the collars 86 to thereby prevent floating up.

After completion of the aforementioned procedure, the spring 12 is attached so as to be stretched between the stopper 10 and the caster shaft bearing 7 to thereby make it possible that the erected and fallen states of the stopper 10 on the upper surface of the caster body 8 can be stably maintained.

After the attachment of the stopper 10 is finished, the holder 9 is attached to the upper surface of the caster body 8 and then the holder 9 and the caster body 8 are rotatably connected to each other through a connection pipe 84. The holder 9 is bellowed around the lower side of the connection pipe 84 to prevent axial movement.

Because the frontwards inclination (the inclination frontward from the vertical position) of the engagement/stopper segment 101 of the stopper 10 is limited by connecting the holder 9 to the upper surface of the caster body 8, the floating prevention tabs 102 are prevented from moving in the direction reverse to the arrow b illustrated in FIG. 4. As a result, the engagement between the tabs 102 and the collars 86 can be maintained at a predetermined position, so that there is no possibility of dropping out.

In the case where the upper end portion of the stopper 10 is inclined in the direction reverse to the arrow a, the engagement between the tabs 102 and the collars 86 cannot be released. Accordingly, there is no possibility that the stopper 10 drops out due to the reverse inclination.

After assembling is finished through the aforementioned procedure, the spring 82 is interposed between the caster body 8 and the caster shaft bearing 7 when the wheel W is attached. Thus, the assembling process is entirely finished.

The invention constructed as described above operates as follows.

(1) In the case where the engagement of the stopper has been released.

The case where the engagement of the stopper 10 has been released means the case where the baby carriage A is in its available state in which the wheel W can rotate and the caster C supporting the wheel can freely swing.

In this case, the engagement/stopper segment 101 constituting a part of the stopper 10 is disengaged from the fitting grooves 91 of the holder 9, so that the holder 9 and the caster body 8 can freely rotate relative to each other through the pivot 83.

Releasing the engagement of the stopper can be made in either when the baby carriage is unfolded or when it is folded.

(2) In the case where the engagement of the stopper should be carried out.

In this case, the stopper 10 previously maintained in the fallen state against the caster body 8, as described in the foregoing paragraph, is raised. The caster body 8 together with the wheel W is rotated either left or right so that the engagement/stopper segment 101 of the erected stopper 10 can be automatically fitted in the course of rotation of the caster body 8 into one of the fitting grooves 91 respectively formed at the front and the rear of the holder 9 to thereby limit the further rotation of the caster body 8. Thus, the engagement of the stopper 10 can be easily carried out.

If the engagement/stopper segment 101 is moved from the fallen state to the erected state, the stopper 10 can be maintained at the erected state by force of the spring 12. Accordingly it is unnecessary that the user should adjust the engagement/stopper segment 101 to the fitting groove 91 of the holder 9 for the purpose of engagement since the upwardly biased stopper 10 can ride on a ridge formed on a bottom circumference of the holder 9 until it drops into one of the fitting groove 91. Accordingly, the engaging operation can be easily made.

Even after the engagement of the stopper 10 it is still possible to rotate the wheel W for the purpose of the movement of the baby carriage as long as the baby carriage is unfolded. In this case, however, a smooth movement of the baby carriage followed by a swinging movement of the caster body 8 cannot be made while the baby carriage can be moved only straight.

The stoppage by the stopper 10 is maintained even in the case where folding operation is carried out.

Although the stoppage by the stopper 10 is maintained in the case where the folding operation is carried out, the engaging operation can be carried out in the case where the baby carriage has been folded and the stoppage by the stopper has been released.

(3) In the case where the engagement of the stopper should be released.

In this case, the engagement/stopper segment 101 of the stopper 10 being in the state of engagement as described above is pushed down toward the back. Then, the engagement between the engagement/stopper segment 101 and the fitting groove 91 of the holder 9 is released by an operation with the foot or the like. Thus, the engagement between the two can be instantly released to thereby realize the state as described in the first section.

Releasing the engagement of the stopper 10 can be made in either state where the baby carriage is unfolded or folded.

The effects of the invention constructed as described above are as follows.

(1) Because the engagement/stopper projections 103 are integrally formed at the opposite sides of the stopper 10, problems caused in assembly by the use of a separately provided engagement/stopper pivot can be completely eliminated.

Further, because the engagement/stopper bosses 103 can be formed at the same time when the stopper 10 is formed, it is possible to reduce the manufacturing cost and to thereby solve the problem that the manufacturing cost becomes high due to the separate formation of the pivot.

(2) In assembly, the engagement/stopper bosses 103 are fitted into the fitting grooves 85 formed at the caster body under the condition that the holder 9 is not attached, and then the stopper is pushed up toward the engagement/stopper segment 101 so that the floating prevention tabs 102 formed at the opposite sides of the top end portions are located at the lower surfaces of the collars 86 formed so as to continuously extend from the vertically elongated grooves 85 formed at the caster body 8. Through such a simple process, assembly can be easily finished. After assembly of the caster C is completed with attachment of the holder 9, floating of the stopper 10 is limited by the engagement between the floating prevention tabs 102 and the J-shaped collars 86 respectively formed so as to extend from the lower ends of the respective fitting grooves 85. Accordingly, if the upper ends of the fitting grooves 85 are not encumbered, there is not the possibility that the engagement/stopper projections 103 may float up and be disengaged from the fitting grooves 85.

(3) Handling operation is very simple.

(4) Because the parts needed for folding need not be formed of metal material but all the constituent parts can be formed of synthetic resin of the same material, rotating parts can smoothly rotated owing to the self-lubricative property inherent in resin.

What is claimed is:

1. A caster for attachment to a leg, comprising:
   a caster body substantially U-shaped in plane having two lateral arms and supporting a wheel;
   a holder connected to said leg and to which said caster body is rotatably attached and having at least one vertical first fitting groove formed on a side surface thereof:
   a stopper pivotally attached to one side of said caster body and pivotally engageable with said fitting groove; and
   a caster stopper mechanism comprising two second fitting grooves formed on inner surfaces of said arms of said caster body, collars projecting outward from said inner surfaces of said arms at a bottom of said second fitting grooves, two projections formed on opposing sides of said stopper fitting into said fitting grooves, and tabs projecting outwardly from said opposing sides of said stopper, wherein said collars are positionable between respective ones of said projections and said tabs to prevent said stopper from separating from said caster body.

2. A caster as recited in claim 1, wherein each of said tabs is attachable and detachable on a side of said collar opposite said projection when a portion of said stopper occupies a space occupied by said holder when said caster body is attached to said holder.

3. A caster as recited in claim 1, further comprising a tension spring connected between said stopper and said caster body for stably maintaining said stopper in engagement with said first fitting groove and for stably maintaining said stopper in a position not in engagement with said first fitting groove.

4. A caster as recited in claim 3, wherein said holder has two opposed first fitting grooves and two circumferential ridges flush with sides of said grooves.

5. A caster as recited in claim 1, further comprising:
   said caster body supports said wheel via a caster bearing supporting same wheel and said caster bearing being pivotally mounted on said caster body; and a compression spring interposed between said caster bearing and said caster body.

6. A caster as recited in claim 5, wherein said tension spring is connected between said stopper and a pivot axle rotatably connecting said caster bearing and said caster body.

7. A caster as recited in claim 1, wherein said stopper is substantially triangularly shaped in side view.

* * * * *